Patented Dec. 15, 1925.

1,565,598

UNITED STATES PATENT OFFICE.

WILLIAM CHARLES SPROESSER, OF BLOOMFIELD, NEW JERSEY, ASSIGNOR TO WESTINGHOUSE LAMP COMPANY, A CORPORATION OF PENNSYLVANIA.

CONTROL OF THE SOFTENING TEMPERATURE OF VITREOUS MATERIAL.

No Drawing.   Application filed October 17, 1922.   Serial No. 595,214.

*To all whom it may concern:*

Be it known that I, WILLIAM CHARLES SPROESSER, a citizen of the United States, and a resident of Bloomfield, in the county of Essex and State of New Jersey, have invented a new and useful Improvement in Control of the Softening Temperature of Vitreous Material, of which the following is a specification.

This invention relates to the control of the softening temperature of vitreous material and more particularly to raising the temperature at which the glass or the like, which may, for example, constitute the walls of evacuated vessels, will soften.

An object of my invention is to control conveniently the softening temperature of vitreous material.

Another object of my invention is to modify the characteristics of glass or the like by the application thereto of a substance or mixture which, upon heating, reacts with the surface thereof to change its chemical composition.

A further object of my invention is the treatment of glass, whereby the softening temperature of a portion of an article of glass may be modified without affecting that of the remainder.

A still further object of my invention is the modification of the surface of articles of glass, whereby the softening temperature thereof is altered without appreciable change in the transparency of the glass.

Other objects and advantages of the invention will be disclosed by the following detailed description.

It is frequently desirable to have articles composed of vitreous material, such as glass, in which parts thereof have a different softening temperature from that of other parts. For example, in evacuated vessels, such as X-ray tubes, it may be desirable to have the main chamber or spherical portion thereof of a glass having a higher softening temperature than that of the stems or cylindrical extensions of the tube. Such has heretofore been accomplished by welding or consolidating together different kinds of glass. Such procedure while practicable, is more or less difficult and inconvenient. It may also be desirable to make an article, in final form, of glass of a comparatively low softening temperature and then increase the softening temperature thereof.

According to my invention, I may form the article desired entirely of one kind of glass and modify the softening temperature of a desired portion or the whole thereof by the application thereto of certain compounds or solutions. The compound used, if insoluble, may be applied in the form of a suspension, or, if soluble, as a solution, by spraying or dipping. Such a suspension or solution may be applied to the desired portion or the whole of the glass or vitreous article. The suspension or solution, whichever is used, may then be allowed to dry, and the article or a portion thereof heated to cause a chemical combination or reaction between the applied material and the surface of the glass where heated. This reaction will result in the formation of a layer of glass of a different composition which, therefore, has a different softening temperature. Whether such softening temperature is higher or lower depends on the material applied thereto. It will be evident that the material may be applied to the whole of the glass and only a portion heated. The excess material may then be washed off, leaving only a portion of the article altered, with respect to its softening temperature.

My invention will be better understood by the following detailed description, which discloses one embodiment of my inventive idea, although it is obvious that the same may be used for other purposes, which will be apparent to those skilled in the art.

The material for application to a glass article may be prepared by forming a solution thereof and dipping the article, such, for example, as a bulb for an incandescent lamp, therein to coat the portion thereof which it is desired to change with respect to its softening temperature. Various solutions have been tried on electric lamp bulbs for this purpose, for example, microcosmic salt (sodium ammonium hydrogen phosphate), di-ammonium hydrogen phosphate, sodium tetraborate and boric oxide. Of the four above-mentioned salts, microcosmic salt was found to be the most efficient in raising the softening temperature of the glass. The softening temperature of that portion of the glass treated with a solution of microcosmic salt was not only considerably increased but the appearance of the glass after heating was not appreciably altered.

The solutions above mentioned were applied by dipping the open ends of bulbs of glass, the approximate composition of which was, $SiO_2$, 69.66%; $Na_2O$, 18.29%; $K_2O$, .027%; $Al_2O_3$, 1.22%; $Fe_2O_3$, 1.22%; MgO, 4.83% and CaO, 5.06%, for a distance of about two inches therein and then heating the bulbs to evaporate to dryness the film of the solution thereon. The bulbs were then sealed-in and the approximate softening temperature of the surface-treated but unworked glass was judged by the time necessary to complete the sealing-in operation, consideration also being given to the appearance of the glass after having been heated. The indications were that some of the salts used raised the softening temperature approximately 125° C.

Portions of the surface-treated glass were then melted and worked or puddled so that the applied salt was uniformly mixed therethrough, and the softening temperature of the puddled glass, with the salts used, was found to be increased only from 2° to 19° C. Of course, when the glass is tested after working or puddling up, a different condition exists, than when the solution is merely applied to the surface of the glass and heated. By the mixing process, the small proportion of the salt applied will be incorporated as a part of the glass and, therefore, a smaller effect is obtained than when such salt is used to modify merely the surface of a glass article.

After the salt was applied to the bulb and the bulb heated, during the sealing-in process, it seemed apparent that the solution acted merely on the surface of the glass, to a very small depth from the outside, to form a thin layer of new glass which served to control the softening temperature. The layer of new glass gives the bulb a different softening temperature than the original glass and is effective in modifying, to a considerable extent, the softening temperature of the article. Below are tabulated the results obtained with the use of several different salts, as compared with untreated glass.

| Treating solution about 25% by weight | Estimated softening temperature °C., unworked glass. | Softening temperature °C., puddled glass. | Appearance of glass after treatment. |
|---|---|---|---|
| $Na(NH_4)HPO_4$ | 828 | 722 | No appreciable change. |
| $(NH_4)_2HPO_4$ | 820 | 719 | Some opaqueness just visible. |
| $Na_2B_4O_7$ | 780 | 705 | Slight opaqueness. |
| $B_2O_3$ | 800 | 709 | Quite opaque. |
| Untreated | 703 | 703 | |

The above indicated results show that the use of sodium ammonium hydrogen phosphate effects the greatest increase in the softening temperature of the puddled glass. This corresponds to the estimated softening temperature of the unworked glass noted during the sealing-in operation. It is, of course, obvious that the higher the concentration of the solution or suspension used, the more salt will be applied and the greater will be the variation of the softening temperature. The table also shows that, except in one instance, after applying the particular solutions and heating, the glass was altered in appearance in different degrees, depending upon the salt used.

Although it is not absolutely certain what chemical reactions take place when such salts are applied to the surface of the glass and heated to cause them to react therewith, it is thought that, when salts of phosphoric acid, such as di-ammonium hydrogen phosphate and microcosmic salt are used, a decomposition is effected which frees metaphosphoric acid which is a non-volatile strong acid even at high temperatures. In contact with the glass, it probably replaces the silicate radical in part, forming phosphates with the basic elements in the glass.

It should be noted that heating is not essential to change potentially, the softening temperature of the glass on which the temperature control agent is applied since once the glass has been coated with this material, it will not on subsequent heating again soften at its original softening temperature but at the modified softening temperature.

Although I have described my invention as applied to incandescent-lamp bulbs, it will be obvious that the same may be used upon any glass articles, for example, arbors and buttons of lamp mounts, X-ray tubes, radio bulbs or other articles, where it is desired to cause different portions thereof to have different softening temperatures or where it is desired to form the article and then increase the softening temperature thereof, in whole or in part.

Although I have described what I now consider to be preferred embodiments of my invention, it is to be understood that modifications will suggest themselves to those skilled in the art within the spirit and scope of the appended claims.

What is claimed is:

1. The method of potentially increasing the softening temperature of vitreous material a desired amount comprising applying a material to the surface thereof to react chemically therewith.

2. The method of potentially increasing a predetermined amount the temperature at which glass will soften comprising applying a material which forms refractory, vitreous compounds on the surface thereof.

3. The method of potentially modifying the softening temperature of glass comprising applying thereto a salt of phosphoric acid.

4. The method of potentially changing the temperature at which glass will soften comprising applying a solution of a salt of phosphoric acid thereto.

5. The method of potentially changing the temperature at which glass will soften comprising applying a solution of microcosmic salt thereto.

6. The method of potentially changing the softening temperature of a portion of an article of glass comprising preparing a solution of microcosmic salt and dipping the article therein to coat a portion of the surface therewith.

7. The method of potentially increasing the temperature at which a portion of a glass article will soften comprising preparing a solution of microcosmic salt and coating a part of the surface of the article therewith to cause a chemical reaction on the coated surface of the article.

8. The method of increasing the softening temperature of a portion of a glass article comprising applying a solution of microcosmic salt thereto by dipping the article therein, drying said article and heating the same to cause the formation of a film of a more refractory glass upon the surfaces of the dipped portion.

9. An article of manufacture comprising a vitreous substance, a portion of which has a higher softening temperature than that of the remainder caused by the application to the surface of said substance of material to chemically react therewith.

10. An article of manufacture comprising glass, a portion of which has its softening temperature increased by the application thereto of material forming more-refractory vitreous compounds on the surface of said portion.

11. An article of manufacture comprising glass, a portion of which has its softening temperature modified by the application thereto of a salt of phosphoric acid.

12. An article of manufacture comprising glass of different softening temperatures caused by applying a solution of a salt of phosphoric acid to a part of said article.

13. An article of manufacture comprising glass of nonuniform softening temperatures caused by the application of a solution of microcosmic salt to a portion of said glass.

14. An article of manufacture comprising glass having a portion thereof modified with respect to its softening temperature by the application of a solution of microcosmic salt to the surface thereof.

15. An electrical device constructed of glass, a portion of which has a higher softening temperature than another portion thereof caused by applying a solution of microcosmic salt to the surface of said first-mentioned portion to cause a chemical reaction thereon.

16. An electrical device of glass, a portion thereof having a higher softening temperature than another portion thereof caused by applying to the surface thereof a solution of microcosmic salt and heating said first-mentioned portion to cause an interaction of said salt with the surface thereof to form more-refractory vitreous compounds on said surface.

In testimony whereof, I have hereunto subscribed my name this sixteenth day of October, 1922.

WILLIAM CHARLES SPROESSER.